United States Patent

Thigpen

[11] Patent Number: 4,484,314
[45] Date of Patent: Nov. 20, 1984

[54] COP SWITCH-POSITION ENCODER, METHOD AND APPARATUS

[75] Inventor: Ben B. Thigpen, Houston, Tex.

[73] Assignee: Western Geophysical Company of America, Houston, Tex.

[21] Appl. No.: 294,585

[22] Filed: Aug. 20, 1981

[51] Int. Cl.³ .................... G01C 17/38; G01K 15/00
[52] U.S. Cl. .................................. 367/58; 367/59; 340/825.03
[58] Field of Search .................. 367/50, 58, 59, 76; 340/825.03, 825.79; 73/1 D

[56] References Cited

U.S. PATENT DOCUMENTS

| | | | |
|---|---|---|---|
| 3,618,000 | 11/1971 | Carruth, Jr. | 367/58 X |
| 3,638,176 | 1/1972 | White | 367/50 X |
| 3,878,463 | 4/1975 | Lanigan | 340/825.03 X |
| 4,281,403 | 7/1981 | Siems et al. | 367/76 |

*Primary Examiner*—Maynard R. Wilbur
*Assistant Examiner*—Brian Steinberger
*Attorney, Agent, or Firm*—William A. Knox

[57] ABSTRACT

A pulse is applied sequentially to each geophone input line to the stator of a CDP switch. A pulse detector is connected to the first output line of the CDP Switch cursor. A counter counts the number of pulses applied to inactive input lines before a pulse is detected by the pulse detector. The pulse count is the geophone group number of the first active geophone group.

14 Claims, 1 Drawing Figure

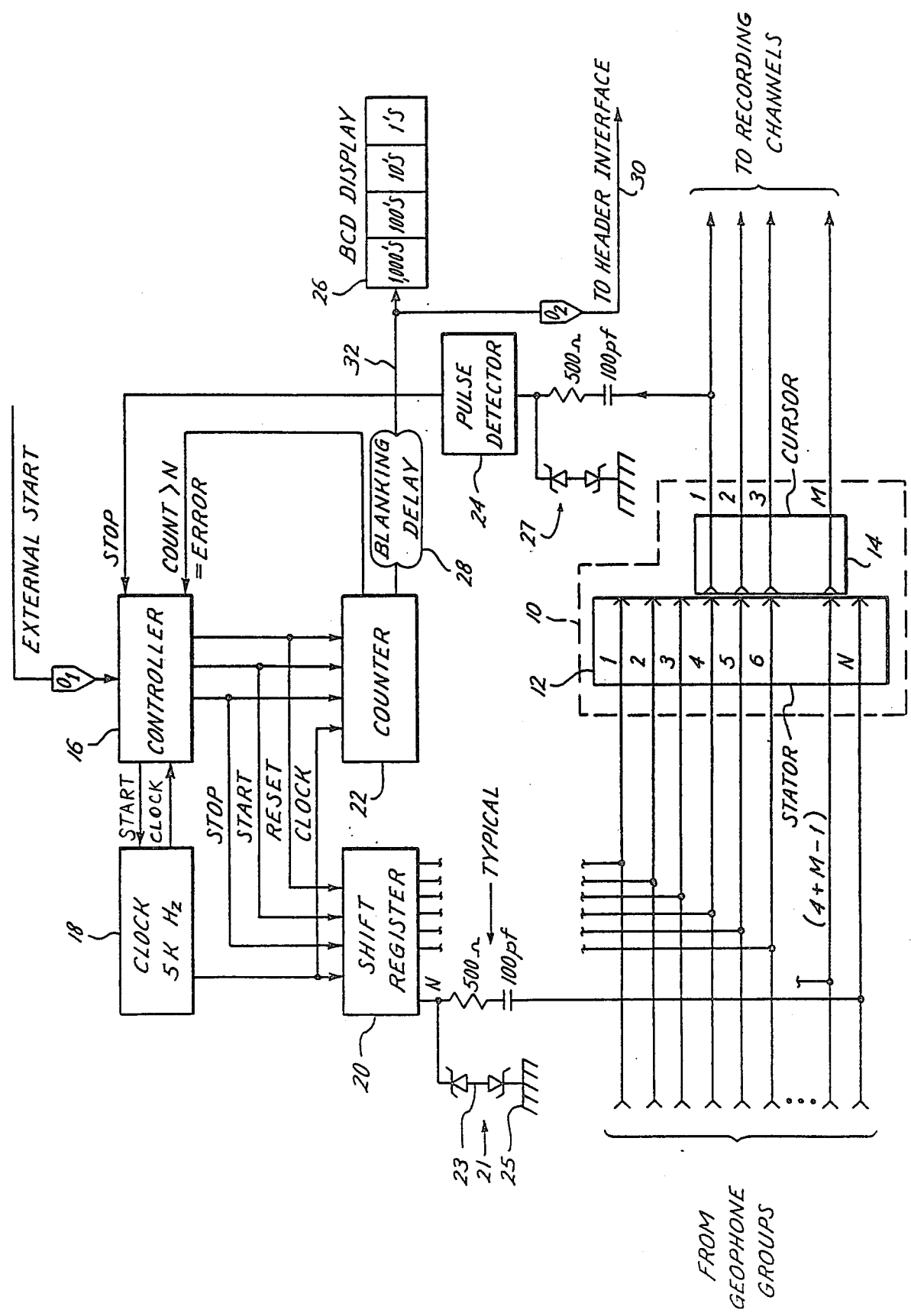

COP SWITCH-POSITION ENCODER, METHOD AND APPARATUS

BACKGROUND OF THE INVENTION

1. Field of the Invention

This invention relates to geophysical exploration in general and to means for identifying the geophone group number to which recording channel 1 is connected for use with a multichannel recording system employing the common depth point technique.

2. Discussion of the Prior Art

In Common Depth Point (CDP) geophysical surveying practice, a very large number of geophone groups, say 250–500, are laid along a line of survey. A lesser number of recording channels, say 60–120, are connected to a set of geophone groups that include a like number of observation stations. As the survey progresses, the recording channels are repeatedly advanced to new sets of geophone groups. To that end, a so-called CDP switch is employed. The switch consists of two parts: A stator that includes as many switch contacts as there are geophone groups, and a mating cursor having contacts equal in number to the number of recording channels. At the beginning of a line of survey, the cursor may be physically positioned with respect to the stator so that cursor contact 1, coupled to recording channel 1, engages stator contact 1 that is connected to geophone group 1. Similarly, assuming a 60 channel recording system and 240 geophone groups on the ground the last channel, 60, is connected to geophone group 60.

As the survey proceeds, the cursor is moved so that recording channel 1 is connected to geophone group 2 and recording channel 60 is coupled to geophone group 61. Subsequently, the cursor is again moved so that recording channels 1 and 60 are coupled to geophone groups 3 an 63 and so on. Thus in the exemplary system there are always 60 active geophone groups that are connected to recording channels, and 180 inactive groups that remain idle.

At each observation station, an acoustic source is actuated to produce seismic signals that are detected by the active geophone groups; received by the recording channels and recorded on a recording medium such as magnetic tape. Usually just before seismic data are to be recorded, a short "header" or label portion is recorded which provides factual information about instrument settings, area of operations, time of day etc. for each separate seismic data recording at each of a plurality of stations.

When the recorded data are to be processed, it is essential that the geophysicist knows precisely which channel is connected to which geophone group. Ordinarily that information was formerly provided by handwritten notes that were submitted by the field operating technician. Such notes are subjected to human error such as perhaps, an improper cursor setting.

It is the purpose of this invention to provide means for automatically annotating a recording medium, such as a magnetic tape, with the number of the geophone group that is actually connected to recording channel 1 at any point during the survey.

SUMMARY OF THE INVENTION

In accordance with a preferred embodiment of this invention, I provide an encoder for a common depth point switch of the type consisting of a stator having a plurality of contacts connected to a like plurality of geophone lines. A cursor having a lesser plurality of contacts is engageable with a similar number of selected stator contacts. Each cursor contact is coupled to a recording channel. Means are provided for applying an identifiable signal to each of a preselected group of stator contacts in a desired sequence. A selected cursor contact has a means that is responsive to the presence of the identifiable signal for determining the geophone line to which that recording channel is connected.

In accordance with an aspect of this invention, a clock applies a pulse to each stator contact in sequence at timed intervals in response to an external command.

In accordance with another aspect of this invention, a pulse detector is coupled to a selected cursor contact for sensing the arrival of a pulse over the stator contact with which the selected cursor contact is engaged. A counter counts the number of pulses applied between the occurrence of the external command and the arrival of the pulse at the selected cursor contact.

In accordance with yet another aspect of this invention, a seismic recording is automatically annotated with the pulse count which defines the geophone line to which the selected recording channel is connected.

In another embodiment of this invention, the pulse count is visually displayed.

In a further embodiment of this invention, if a pulse is not sensed by the pulse detector, an error count is displayed and recorded on the seismic recording.

BRIEF DESCRIPTION OF THE SOLE DRAWING

A better understanding of my invention will be had by reference to the appended detailed description and the sole FIGURE that shows schematically the essential elements of my CDP Switch-Position Encoder.

DETAILED DESCRIPTION OF THE INVENTION

Referring to the sole FIGURE, there is shown schematically a DPC switch 10 of conventional manufacture such as the Model 240M made by Input/Output Inc. of Houston, Tex. CDP switch 10 consists essentially of a stator 12, having a plurality of contacts to which are connected a plurality of geophone groups numbered from 1 to N and a cursor 14 having a lesser plurality of contacts that are connected to recording channels 1 to M. By shifting cursor 14 relative to stator 12, different sets of geophone groups may be connected sequentially to the set of recording channels 1 to M through the cursor contacts that engage selected stator contacts. In the position shown, recording channels 1 through M are connected to geophone groups 4 through $(4+M-1)$.

The encoder circuit consists of a controller 16, a pulser or clock 18, a multiple-output shift register or stepper switch 20, a counter 22, a pulse detector 24, and a BCD display 26.

Controller 16 receives an external start command, such as a technician-actuated switch closure, through opto-isolator $O_1$. In response to the start command, controller 16 tells clock 18 to start pulsing and counter 22 is activated to count each pulse received from clock 18. At the same time, shift register 20 is instructed to direct the successive clock pulses to each input line, 1 to N, sequentially. The first pulse goes to geophone input line 1, the next pulse to geophone input line 2 etc.

It will be noted that an isolation/transient protection circuit 21 interconnects each output of the shift register with the respective goephone input lines. The circuits consist of a series-connected RC circuit and a pair of Zener diodes 23 coupled to a floating ground 25. The circuit values are not critical but the resistor is preferably 500 ohms, the capacitance is preferably 100 picofarads, and the diodes are preferably IN758A. All of the lines out of the shift register include such a circuit but only the Nth line is shown as typical to minimize complication of the drawing.

Each pulse passing through shift register 20 is counted by counter 22. As pointed out above, each successive pulse is stepped to each inactive geophone input line. When recording channel 1 receives a pulse from an active geophone group input line to which it is connected, pulse detector 24 connected to channel 1 input line is activated. When activated, pulse detector 24 sends a STOP command to controller 16. Controller 16 thereupon disables shift register 20. Counter 22 is disabled from receiving additional counts and the contents of the counter are transferred to BCD display 26 and to a header interface not shown. In the case of the illustrative example, the count is decimal 4 telling the operator that geophone group 4 is connected to recording channel 1. Shift register 20 and counter 22 are then reset by the controller for a new cycle of events. Note that channel 1 is coupled to pulse detector 24 through an isolation circuit 27 that is the same as the "typical" isolation circuit 21 to channel N of stator 12 of CDP switch 10. These isolation circuits are required in order to maintain the level of inter-channel crossfeed during recording of seismic data, to at least 80 dB down from a full scale signal.

It is possible that for some reason, a malfunction might occur at the input of recording channel 1 such that a pulse is not detected. An error feature is incorporated into counter 22. If the count reaches some prescribed number that is greater than N, then counter 22 sends an error signal to controller 16. In response to the error signal, controller 16 disables shift register 20. The counter sends its error count to the display 26 which now exibits an impossible number as 245 for a 240 group system, thereby alerting the operator that a malfunction has occurred. The erroneous count is also transmitted to the header of the recording medium as an indication that the recording in question may be invalid.

A blanking delay 28 of arbitrary duration may be introduced at the output of the counter. Normally the BCD display will be illuminated for one to three seconds so that the operator can verify that recording channel 1 is connected to the correct geophone group. At the same time the header interface line 30 will be active until the count has been properly recorded on the recording medium. After the blanking delay has expired, the count output on line 32 is removed to prevent crossfeed during data recording. Opto-isolator $O_2$ is provided in line 30 to further isolate the encoder circuit from normal data recording functions.

In some operations, the seismic data are recorded on magnetic tape for archival storage but for field monitoring of data quality, a visual oscillogram is also produced as a paper strip chart. It will be remembered from the drawing that the rate of clock 18 is preferably 5 kHz or 200 μs between pulses. At that clock rate, all 240 geophone-group input channels can be scanned in a little less that half a second. However, on a visual oscillogram the pulses would be too close together to be seen at a normal paper-speed time-base. Accordingly, if visual-oscillographic monitoring is considered important, a much slower clock could be used, on the order of 100 Hz. Alternatively it would be a simple matter for one skilled in the art to extract the BCD display data and transform that data into a visually-discernable BCD pulse code for recording on the paper strip chart.

In the example it was assumed that the first clock pulse was directed to the first geophone group input line. It was further assumed that there were 240 geophone groups to be scanned at 200 μs intervals for a total scan time of 0.480 second. In many operations, a thousand or more geophone groups may be laid out. Two seconds would be required to scan all of the geophone groups. To save time, in an alternate embodiment, I preset the counter 22, the display 26 and the shift register 20, to start counting at some geophone group other than group 1. For example, if cursor 14 is set so that channel 1 is coupled to geophone group 550, the number 500 might be preset, thus considerably shortening the required scan time across the inactive geophone groups before channel 1 detects a pulse.

I claim as my invention:

1. For use with a common depth point switching apparatus for the type consisting of a stator having a plurality of contacts connected to a like plurality of geophone lines and a cursor having a lesser plurality of contacts that are electrically engageable with a similar number of selected stator contacts, the respective cursor contacts being connected to the inputs of a corresponding set of recording channels, an encoder comprising:
    means for applying an identifiable signal to at least a preselected group of stator contacts in a predetermined sequence; and
    means, responsive to presence of the identifiable signal on a preselected cursor contact, for identifying the set of geophone lines to which the recording channels are connected.

2. The encoder as defined by claim 1, wherein the identifiable signal applying means comprises:
    a clock, responsive to an external command, for applying a pulse to each stator contact in sequence at timed intervals.

3. The encoder as defined by claim 2 wherein the geophone line identifying means comprises:
    a pulse detector coupled to a selected cursor contact for sensing the arrival of a pulse over the stator contact with which the selected cursor contact is engaged; and
    means for counting the number of clock pulses applied between the occurrence of said external command and the sensing of a pulse by said pulse detector.

4. The encoder as defined by claim 3, comprising:
    means for disabling said clock and said counting means when a pulse is detected by said pulse detector.

5. The encoder as defined by claim 4, comprising:
    means for providing a visual display of the number of pulses counted when said clock is disabled.

6. The encoder as defined by claim 4, comprising:
    means for entering the pulse count on a recording medium as a digital BCD number when said clock is disabled.

7. The encoder as defined by claim 4, comprising:
    means for generating and displaying an error code when said pulse detector fails to detect a pulse and the number of pulses counted exceeds the number of contacts of said stator; and means in said counter for disabling said clock in the presence of an excessive count.

8. The encoder as defined by claims 2 or 3, comprising:

a multiple-output shift-register coupled to said clock for successively connecting said clock to the respective stator contacts.

9. The encoder as defined by claim 8, comprising:

isolating means coupled between each output of said shift register and the respective stator contacts so that the crossfeed level between the stator contacts due to said shift register and said counter is at least 80 dB down from full scale.

10. In seismic surveying employing a common depth point switching apparatus for connecting a set of recording-channel input lines to successively different sets of geophone lines, a method for automatically identifying the geophone line number to which a selected recording channel input line is connected, comprising the steps of:

applying an identifiable signal to a preselected group of successive geophone lines according to a predetermined sequence;

sensing the presence of the identifiable signal on a selected recording channel input line; and counting the number of geophone input lines to which the identifiable signal was applied before sensing the identifiable signal.

11. The method as defined by claim 10, comprising:

terminating application of the identifiable signal to the successive geophone lines when the identifiable signal is sensed at the input of said selected channel; and displaying the geophone-line count.

12. The method as defined by claim 11, comprising:

recording the geophone line count as a digital number on a recording medium.

13. The method as defined by claim 11, comprising:

displaying an error code when the selected channel input line fails to sense an identifiable signal and the geophone line count exceeds a predetermined number.

14. In common depth point seismic surveying a method for automatically annotating a seismic recording with a code for designating the geophone line number selected from a plurality of geophone lines, to which a selected recording channel is connected, comprising the steps of:

applying sequentially at timed intervals, a pulse to each of a preselected group of geophone lines, until a pulse is sensed by the selected recording channel;

terminating application of the pulses;

counting the number of elapsed intervals accumulated at the instant of termination; and recording the cumulative number on said seismic recording.

* * * * *

UNITED STATES PATENT AND TRADEMARK OFFICE
CERTIFICATE OF CORRECTION

PATENT NO. : 4484314
DATED : 11/20/84
INVENTOR(S) : Thigpen, Ben B.

It is certified that error appears in the above-identified patent and that said Letters Patent are hereby corrected as shown below:

Correct the title to read:

CDP SWITCH-POSITION ENCODER, METHOD AND APPARATUS

Signed and Sealed this

Twenty-third Day of April 1985

[SEAL]

Attest:

DONALD J. QUIGG

Attesting Officer          Acting Commissioner of Patents and Trademarks